June 11, 1957 R. DWYER 2,795,465
SELF-ALIGNING ROD END BEARING
Filed June 21, 1954
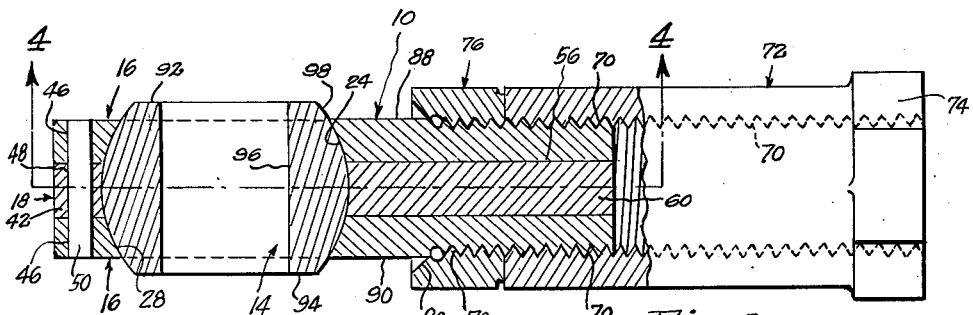
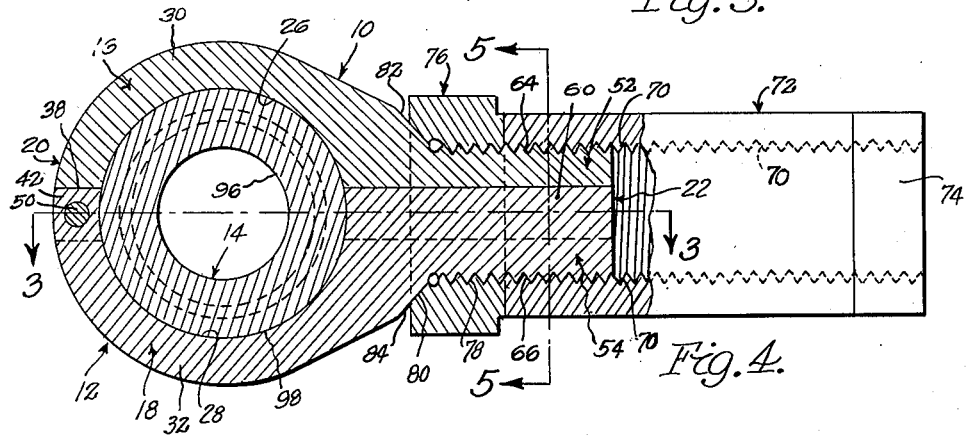
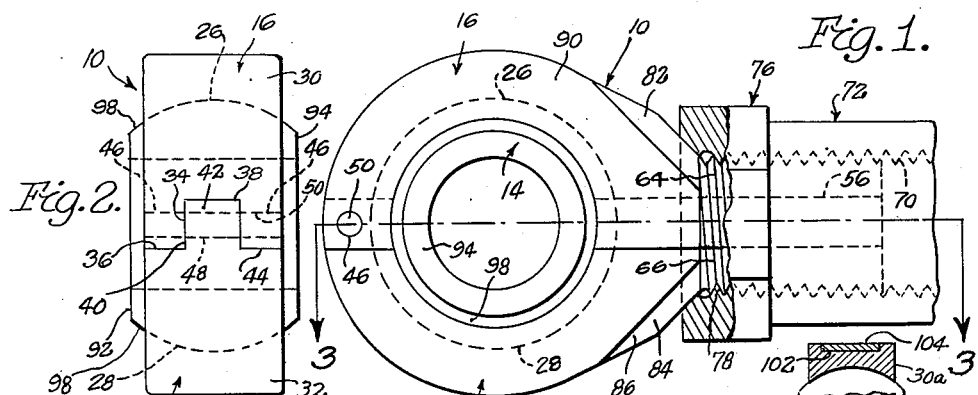
INVENTOR.
Russell Dwyer
BY Barthel & Bugbee
Attys

United States Patent Office 2,795,465
Patented June 11, 1957

2,795,465

SELF-ALIGNING ROD END BEARING

Russell Dwyer, Wolverine, Mich.

Application June 21, 1954, Serial No. 438,209

3 Claims. (Cl. 308—72)

This invention relates to rod end bearings and, in particular, to self-aligning rod end bearings.

One object of this invention is to provide a self-aligning rod end bearing which can be made up of components which fit together accurately with predetermined clearances and without the necessity for using bearing inserts of bronze or other bearing metal, with consequent distortion of the parts as a result of the installation of such inserts.

Another object is to provide a self-aligning rod end bearing, the outer bearing unit or socket unit of which is made up of half components which are accurately fitted and held together in engagement by simple yet effective means.

Another object is to provide a self-aligning rod end bearing of the foregoing character wherein the half components of the outer bearing unit or socket unit are of approximately question-mark shape, with threaded half shanks which fit together side by side to form a split screw shank adapted to receive a threaded locking sleeve.

Another object is to provide a self-aligning rod end bearing of the foregoing character with components which adapt themselves to being produced by forging, if so desired, the half components of the outer bearing unit or socket unit being capable of being easily and accurately provided with concave spherical bearing surfaces adapted to precisely receive and engage an inner bearing member or ball member in the form of a diametrically-bored bearing ball with an accurately-spherical convex surface adapted to precisely fit the internal concave surface of the outer bearing unit.

Another object is to provide a self-aligning spherical bearing of the foregoing character wherein the split shank is omitted and the interfitting semi-annular halves of the bearing held together by a snap ring, this bearing being conveniently used in locations not requiring a shank.

Other objects and advantages of the invention will become apparent during the course of the following description of the accompanying drawings, wherein:

Figure 1 is a fragmentary side elevation, partly in section, of the principal portion of a self-aligning rod end bearing according to one form of the invention;

Figure 2 is a left-hand end elevation of the self-aligning rod end bearing shown in Figure 1;

Figure 3 is a top plan view partly in horizontal section along the line 3—3 in Figure 1 or Figure 4 of the complete rod end bearing;

Figure 4 is a side elevation, partly in vertical section along the line 4—4 in Figure 3, of the complete rod end bearing shown in Figure 3;

Figure 5 is a vertical cross-section taken along the line 5—5 in Figure 4 through the split threaded shank and threaded locking sleeve of the rod end bearing;

Figure 6 is a side elevation, partly in section, of a modified self-aligning annular spherical bearing, according to another form of the invention; and Figure 7 is a right-hand side elevation of the modified bearing shown in Figure 6.

Hitherto, self-aligning rod end bearings have been difficult to manufacture because of the necessity of assembling a ball-shaped inner bearing member within a concave spherical bearing recess, the end openings of which are smaller in diameter than the diameter of the inner bearing member in its central plane. Various subterfuges have been adopted to overcome this problem of solid geometry. In one solution, the rod end on one side was formed with an approximately cylindrical opening to admit the inner bearing element or ball, after which the metal around the opening was deformed to cause it to conform to the outer spherical surface of the ball. This procedure, however, resulted in the deformation of the convex and concave bearing surfaces, with the result that geometrically-inaccurate bearing surfaces were produced. In another prior rod end bearing, the outer ends of the bearing opening in the outer bearing member were made large enough to admit the ball or inner bearing member, the outer ends of the opening being closed, after inserting the ball therein, by approximately annular bearing inserts of bronze or other suitable bearing metal forced into the clearance space between the outer and inner bearing members from opposite sides of the outer bearing member. The latter construction, however, also resulted in deformation of the bearing surfaces, with consequent inaccuracy of engagement.

The self-aligning rod end bearing of the present invention, briefly described, consists of an outer bearing unit or socket unit made up of interlocking halves, each half being roughly in the shape of a question mark, with the outer ends pinned or otherwise locked together and the interlocking half shanks at the inner ends held together by an internally-threaded sleeve which is threaded upon the threaded half shanks in their interfitted and interlocking positions. In this manner, by making the annular outer bearing unit in diametrically parted halves, the concave spherical surface for receiving the inner bearing member or ball member can be accurately formed yet the ball member can be assembled within the halves as they are being fitted together and interlocked.

Referring to the drawings in detail, Figures 1 to 4 inclusive show the self-aligning rod end bearing of the present invention, generally designated 10, as consisting generally of an outer bearing unit or socket unit 12 containing an inner bearing member or ball member 14. The outer bearing unit 12 is made up of half components, generally designated 16 and 18 respectively, the outer bearing unit 12 having a hollow annular head portion 20 and a rod-like shank portion 22 projecting radially therefrom. The hollow annular head portion 20 of the outer bearing unit 12 is provided with a bearing recess 24 having a spherically curved surface divided into half zones or half portions 26 and 28 respectively located in the half components 16 and 18.

The half components 16 and 18 of the outer bearing unit 12 are roughly in the shape of question marks facing one another, with half annular or arcuate portions 30 and 32 respectively containing the half annular concave spherical surfaces 26 and 28. The outer end of the arcuate portion 30 is provided with a notch 34 of rectangular shape in the end surface 36 thereof, forming a crenellated portion 38 (Figure 2) which receives the oppositely-crenellated portion 40 consisting of a rectangular-shaped tongue 42 projecting from the end surface 44 of the arcuate portion 32 and fitting into the notch 34. The interfitting crenellated portions 38 and 40 are drilled transversely with aligned bores 46 in the crenellated portion 38 and a bore 48 in the tongue 42 of the crenellated portion 40. A locking pin 50 is seated in the bores 46 and 48 in the assembly 12 of the half components 16 and 18 respectively.

The shank portion 22 consists of interfitting half shanks 52 and 54 (Figure 5) of crenellated cross-section, the half shank 52 being of slightly greater circumferential extent than a semi-cylinder, and the half shank 54 being of slightly less circumferential extent than a semi-cylinder. The half shank 52 is provided with a central longitudinal groove 56 of rectangular cross-section projecting inwardly from the adjacent longitudinal surfaces 58. A rib 60 of rectangular cross-section fits into the groove 56 and projects laterally from the longitudinal surfaces 62 on opposite sides of the rib 60.

The half shanks 52 and 54 have external threaded surfaces 64 and 66 which in assembly provide a complete threaded external surface 68 which receives the correspondingly threaded internal surface or bore 70 in an internally-threaded sleeve, generally designated 72. The sleeve 72 at its outer end is provided with a hexagonal head 74 adapted to receive a conventional wrench in order to put on and remove the sleeve 72. Between the sleeve 72 and the head portion 20 is mounted a nut 76 of hexagonal or other suitable outline having an internally-threaded portion or bore 78, one end of which is flared or provided with an internally-conical portion 80 which fits correspondingly conical portions 82 and 84 on the half components 16 and 18 of the head portion 20 adjacent the junctions of the arcuate portions 30 and 32 with the shank portions 52 and 54. These conical portions 82 and 84 in assembly (Figure 1) form an interrupted conical surface, generally designated 86, so described because the opposite sides thereof are interrupted by the flat upper and lower surfaces 88 and 90 of the head portion 20.

The inner bearing member or ball member 14 is in the shape of a ball with flattened zonal opposite sides 92 and 94 and a bore 96 therethrough for receiving the bolt, stud, pin, shaft or other element to which the rod end bearing 10 of the present invention is to be connected. The inner bearing member or ball 14 is provided with an external spherical surface 98 which accurately fits the concave or internal spherical surfaces 26 and 28 of the outer bearing unit or socket unit 12 with a sufficient clearance therebetween to permit suitable relative movement therebetween.

In the operation of the invention, let it be assumed that the various parts of the rod end bearing 10 have been disassembled into the inner bearing member or ball member 14, the outer bearing unit halves 16 and 18, the pin 50, the internally-threaded sleeve 72 and the nut 76. To assemble the rod end bearing 10 from these parts, the assembler places the inner bearing member 14 or ball member 14 into one of the concave spherical surface portions 26 or 28 in one of the half components 16 or 18, and then brings the other half component into engagement therewith, causing the tongue 42 to enter the notch 34 in order to permit the bores 46 and 48 to be aligned, at the same time causing the rib 66 to enter the groove 56 so as to cause the shank halves 52 and 54 to interfit with one another. With the components in this position, the pin 50 is driven through the aligned holes 46 and 48, a tapered pin and correspondingly tapered bores being optionally employed.

The nut 76 is then threaded upon the threaded external surface 68 of the split shank 22 until its flared or internal conical end portion 80 engages the external conical surfaces 82 and 84 of the half components 16 and 18 respectively. The sleeve 72 is then threaded upon the threaded portion 68 of the shank 22 until its inner end engages the nut 74, leaving a considerable portion of the threaded bore 70 exposed to receive the correspondingly threaded end of the rod (not shown) upon which the rod end bearing 10 is to be mounted. The rod end bearing 10 is disassembled into its various components described above by reversing the order of assembly as explained above.

The rod end bearing 10 of the present invention is used in any location or for any purpose where conventional rod end bearings have been previously used, and finds a particularly useful application in aircraft use. The rod end bearing 10 is manufactured by relatively simple yet highly accurate production methods, so that in assembly its outer and inner bearing members 12 and 14 move freely relatively to one another yet with imperceptible play, depending upon the clearances employed. When once the various components of the rod end bearing 10 have been assembled, they are held tightly together by the pin 50, the nut 76 and the internally-threaded sleeve 72, any one of which will hold the parts in assembly in the event of breakage, loss or absence of the other two parts. When the components are thus assembled and locked together by the pin 50, nut 76 and internally-threaded sleeve 72, they behave, for all practical purposes, like a rod end bearing composed of only two parts whereas in practice these two parts, each made in integral form, would be geometrically incapable of assembly for the reasons previously stated above.

The modified self-aligning spherical bearing, generally designated 100, is generally similar in construction to the bearing end of the rod end bearing 10, and similar parts thereof are accordingly similarly designated with reference numerals. In the self-aligning bearing of Figure 6, however, the split shank 22 is omitted and the bearing race halves 30a and 32a interfitted with tongue and groove joints on diametrically-opposite sides instead of on one side only. In place of the pin 50 for additionally securing the halves together, the peripheries of the halves 30a and 32a are annularly grooved as at 102 to receive snap ring 104 having a gap 106 between its opposite ends 108 and 110.

In assembling the self-aligning spherical bearing 100, the halves 30 and 32 are placed over the ball 14 with the tongue 60 fitting into the groove or notch 56, whereupon the snap ring 104, which is of spring steel or other spring material, is spread apart at its ends 108 and 110 to increase the gap 106 sufficiently to permit the thus-enlarged snap ring 104 to be slipped over the peripheries of the half annular portions 30a and 32a and permitted to snap into its retaining position within the annular groove 102. The operation of the self-aligning spherical bearing 100 is similar to that of the rod end bearing 10 as previously described above.

What I claim is:

1. A self-aligning rod end bearing comprising an outer bearing unit composed of a pair of outer bearing unit components of approximately question-mark shaped form adapted to fit together, said unit having a head divided into opposite halves and containing a socket with a spherically-curved concave surface, said unit also having a longitudinally-divided shank projecting laterally therefrom and having halves lying side by said, one of the shank halves having an elongated longitudinal recess, the other shank half having an elongated projection fitting said recess, said components including portions of said head and shank, said head having substantially parallel opposite sides separated from one another by a space less than the diameter of said concave surface of said socket and intersecting said socket in a plurality of laterally-spaced side openings, means for securing said components to one another, and a one-piece inner bearing member seated in said socket and having a spherically-curved convex outer surface fitting the spherically-curved concave surface of said socket.

2. A self-aligning rod end bearing comprising an outer bearing unit composed of a pair of outer bearing unit components of approximately question-mark shaped form adapted to fit together, said unit having a head divided into opposite halves and containing a socket with a spherically-curved concave surface, said unit also having a longitudinally-divided shank projecting laterally therefrom and having halves lying side by side, said components including portions of said head and shank, said head having substantially parallel opposite sides separated from one another by a space less than the diameter of said concave surface of said socket and intersecting said socket in a plurality of laterally-spaced side openings, means for securing the opposite ends of said components to one another, the outer end of one of the head halves having a recess therein and the outer end of the other head half having a projection thereon fitting said recess, and a one-piece inner bearing member seated in said socket and having a spherically curved convex outer surface fitting the spherically-curved concave surface of said socket.

3. A self-aligning rod end bearing comprising an outer bearing unit composed of a pair of outer bearing unit components of approximately question-mark shaped form adapted to fit together, said unit having a head divided into opposite halves and containing a socket with a spherically-curved concave surface, said unit also having a longitudinally-divided shank projecting laterally therefrom and having halves lying side by side, said components including portions of said head and shank, said head having substantially parallel opposite sides separated from one another by a space less than the diameter of said concave surface of said socket and intersecting said socket in a plurality of laterally-spaced side openings, means for securing the opposite ends of said components to one another, the outer end of one of the head halves having a recess therein and the outer end of the other head half having a projection thereon fitting said recess, and a one-piece inner bearing member seated in said socket and having a spherically-curved convex outer surface fitting the spherically-curved concave surface of said socket, said securing means including a fastener passing through and interconnecting the outer ends of the head portions of said components.

References Cited in the file of this patent

UNITED STATES PATENTS

| | | |
|---|---|---|
| 1,807,373 | Blunt | May 26, 1931 |
| 2,047,885 | Riebe | July 14, 1936 |
| 2,478,660 | Keahey | Aug. 9, 1949 |

FOREIGN PATENTS

| | | |
|---|---|---|
| 535,264 | France | Jan. 21, 1922 |
| 583,008 | France | Jan. 5, 1925 |